(12) United States Patent
Milke et al.

(10) Patent No.: US 12,140,488 B2
(45) Date of Patent: Nov. 12, 2024

(54) SENSOR AND METHOD FOR PRODUCING A SENSOR

(71) Applicant: TDK Electronics AG, Munich (DE)

(72) Inventors: Bettina Milke, Berlin (DE); Andreas Peschka, Michendorf (DE)

(73) Assignee: TDK Electronics AG, Munich (DE)

( * ) Notice: Subject to any disclaimer, the term of this patent is extended or adjusted under 35 U.S.C. 154(b) by 276 days.

(21) Appl. No.: 17/635,929

(22) PCT Filed: Jan. 21, 2021

(86) PCT No.: PCT/EP2021/051253
§ 371 (c)(1),
(2) Date: Feb. 16, 2022

(87) PCT Pub. No.: WO2021/170314
PCT Pub. Date: Sep. 2, 2021

(65) Prior Publication Data
US 2022/0390308 A1 Dec. 8, 2022

(30) Foreign Application Priority Data

Feb. 27, 2020 (DE) .......................... 102020105210.3

(51) Int. Cl.
*G01L 9/00* (2006.01)
(52) U.S. Cl.
CPC .................. *G01L 9/0055* (2013.01)
(58) Field of Classification Search
CPC ..... G01L 9/0055; G01L 9/0054; G01L 5/162; G01L 5/1627; G01L 9/0042

USPC .... 73/862.581, 763, 774–777, 862.632, 721, 73/727; 338/2–6, 36, 42; 324/691
See application file for complete search history.

(56) References Cited

U.S. PATENT DOCUMENTS

| | | |
|---|---|---|
| 3,451,030 A | 6/1969 | Garfinkel |
| 4,373,399 A | 2/1983 | Beloglazov |
| 4,975,390 A | 12/1990 | Fujii |
| 5,471,086 A | 11/1995 | Ipposhi |
| 5,872,315 A | 2/1999 | Nagase |
| 5,898,359 A | 4/1999 | Ellis |
| 6,510,742 B1 | 1/2003 | Johnson |
| 2005/0284228 A1 | 12/2005 | Toyoda |
| 2007/0068267 A1 | 3/2007 | Kurtz |
| 2007/0095144 A1 | 5/2007 | Oboodi |
| 2008/0202249 A1 | 8/2008 | Yokura |

(Continued)

FOREIGN PATENT DOCUMENTS

| | | |
|---|---|---|
| CN | 1474434 A | 2/2004 |
| CN | 101356426 A | 1/2009 |

(Continued)

OTHER PUBLICATIONS

Examination Report in related Japanese Patent Application No. 2022-511304, in Japanese, dated Jun. 28, 2023 (5 pages).

(Continued)

*Primary Examiner* — Robert R Raevis
(74) *Attorney, Agent, or Firm* — Nixon Peabody LLP

(57) ABSTRACT

A sensor including a deformation body having a membrane for deformation when subjected to pressure from a medium. The sensor further includes a strain element applied to and attached to the membrane. The strain element is based on SOI technology and has multiple piezoresistive resistors.

19 Claims, 2 Drawing Sheets

(56) References Cited

U.S. PATENT DOCUMENTS

Figure 1:
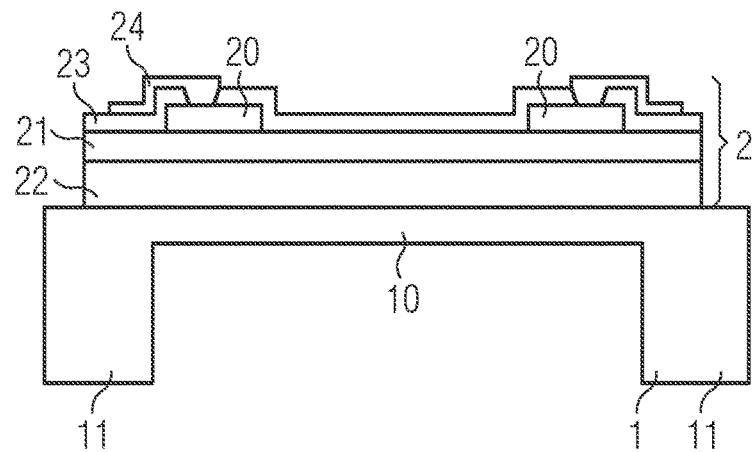

| | | |
|---|---|---|
| 2009/0243003 A1 | 10/2009 | Renna |
| 2011/0203381 A1 | 8/2011 | Kurtz |
| 2012/0017693 A1 | 1/2012 | Robert |
| 2013/0015537 A1 | 1/2013 | Nowak |
| 2013/0228022 A1 | 9/2013 | Brown |
| 2016/0051754 A1 | 2/2016 | Boit |
| 2016/0123828 A1 | 5/2016 | Matzen |
| 2019/0120781 A1 | 4/2019 | Kobayashi |

FOREIGN PATENT DOCUMENTS

| | | | | |
|---|---|---|---|---|
| CN | 102374918 A | | 3/2012 | |
| CN | 105181189 A | | 12/2015 | |
| CN | 106052940 A | * | 10/2016 | ............ G01L 19/14 |
| CN | 107131994 A | * | 9/2017 | ........... G01L 19/148 |
| CN | 109540371 A | * | 3/2019 | ........... G01L 9/0055 |
| DE | 69700021 T2 | | 1/1999 | |
| DE | 10238720 A1 | | 3/2004 | |
| DE | 69822770 T2 | | 8/2004 | |
| DE | 3918818 B4 | | 3/2006 | |
| DE | 102008000128 A1 | | 8/2008 | |
| DE | 102013114728 A1 | | 7/2015 | |
| DE | 102014205326 A1 | | 9/2015 | |
| DE | 102015209683 A1 | | 1/2016 | |
| DE | 202019102861 U1 | | 6/2019 | |
| EP | 2516980 A1 | | 10/2012 | |
| EP | 2620757 A1 | | 7/2013 | |
| EP | 2637088 A2 | | 9/2013 | |
| JP | 2000283868 A | * | 10/2000 | |
| JP | 2006010623 A | | 1/2006 | |
| JP | 2008185460 A | | 8/2008 | |
| JP | 2009025065 A | | 2/2009 | |
| JP | 2012027026 A | | 2/2012 | |
| JP | 2016051754 A | * | 4/2016 | |
| JP | 2020008550 A | | 1/2020 | |
| WO | WO 03/040676 A1 | | 5/2003 | |

OTHER PUBLICATIONS

International Search Report and Written Opinion of International Searching Authority corresponding to International Patent Application No. PCT/EP2021/051253, with English translation of International Search Report, mailed Apr. 16, 2021 (13 pages).

Ha-Duong Ngo et al.; "Advanced Liquid-Free, Piezoresistive, SOI-Based Pressure Sensors for Measurements in Harsh Environments"; Sensors 15.8, pp. 20305-20315; 2015; DOI: 10.3390/s150820305; ISSN: 1424-8220 (11 pages).

Examination Report in related European Patent Application No. 21701717.7, in German, dated Oct. 13, 2023 (5 pages).

Examination Report in related Chinese Patent Application No. 202180005110.5, in Chinese, dated Sep. 1, 2023 (8 pages).

Examination Report in related Chinese Patent Application No. 202180005110.5, in Chinese, dated Apr. 15, 2024 (5 pages).

* cited by examiner

SENSOR AND METHOD FOR PRODUCING A SENSOR

CROSS-REFERENCE TO RELATED APPLICATIONS

This application is a U.S. National Stage of International Application No. PCT/EP2021/051253, filed Jan. 21, 2021, which claims the benefit of Germany Patent Application No. 102020105210.3, filed Feb. 27, 2020, both of which are incorporated herein by reference in their entireties.

A sensor is disclosed. Furthermore, a method for manufacturing a sensor is given.

One task to be solved is to specify a sensor that can withstand high temperatures and can also be used in aggressive media. Another task to be solved is to disclose a method for manufacturing such a sensor.

These tasks are solved, inter alia, by the objects of the independent patent claims. Advantageous embodiments and further developments are the object of dependent patent claims and further emerge from the following description and the figures.

First, the sensor is indicated. The sensor is in particular a pressure sensor for measuring pressure in liquids or gases. The sensor can be used, for example, in industrial plants, in reactors or in refrigeration/air conditioning systems.

According to at least one embodiment, the sensor comprises a deformation body comprising a membrane for deformation upon exposure to pressure from a medium. The deformation body may further comprise a support body to which the membrane is mechanically connected. Preferably, the membrane is arranged on the support body such that it can move relative to the support body. In particular, the membrane is adapted to vibrate relative to the support body and/or to be bent relative to the support body.

For example, the support body is annular or frame-shaped such that the support body laterally surrounds a cavity. The membrane is disposed on the support body such that it bounds and closes the cavity in a vertical direction, perpendicular to the lateral direction, thereby forming a cover surface on the support body. A lateral direction here and hereinafter refers to a direction parallel to the main extension plane of the membrane.

In the region not supported by the support body, that is, in the region adjacent to the cavity, the membrane may vibrate or bend. The support body and the membrane may be formed integrally with each other or may be different elements applied to each other. In the second case, the support body and the membrane may be made of different or the same materials.

The membrane has, for example, a maximum and/or average thickness, measured perpendicular to the main extension plane of the membrane, between 50 µm and 1 mm inclusive, preferably between 100 µm and 500 µm inclusive. The thickness of the membrane thereby also depends on the material of the membrane.

According to at least one embodiment, the sensor comprises a strain element applied to the membrane and attached to the membrane. The strain element is, for example, a semiconductor chip. The strain element is preferably applied to a side of the membrane facing away from the support body. Particularly preferably, the strain element is applied only or mainly in the area of the membrane that is not supported by the support body, i.e. in the area that can vibrate freely. If the membrane is bent as a result of pressure from a medium, the strain element is then also bent. The strain element is arranged to convert a pressure-induced bending stress of the deformation body into an electrical signal.

According to at least one embodiment, the strain element is based on SOI (silicon-on-insulator) technology and has multiple piezoresistive resistors. In other words, the strain element has a silicon substrate, a $SiO_2$ layer on the silicon substrate, and multiple piezoresistive resistors. The silicon substrate may consist of doped silicon or undoped silicon.

The silicon substrate preferably extends over all or substantially all of the lateral extent of the strain element. In particular, the silicon substrate forms a preferably self-supporting component of the strain element which supports the strain element. The silicon substrate may have traces of a separation process, for example traces of a physical or chemical material removal, on side surfaces extending transversely to the main extension plane of the membrane. These traces result, for example, from a singulation process in which the strain element is detached from a wafer.

The piezoresistive resistors are preferably formed from doped silicon. The piezoresistive resistors are contacted, for example, by metallic conductor tracks. The $SiO_2$ layer is preferably located in a plane between the piezoresistive resistors and the silicon substrate. The silicon substrate preferably faces the membrane and the piezoresistive resistors face away from the membrane. The piezoresistive resistors are electrically isolated from the silicon substrate, for example, by the $SiO_2$ layer.

The strain element comprises, for example, at least two or at least four piezoresistive resistors. In particular, the piezoresistive resistors are interconnected to form a network, such as a half bridge, a full bridge, a voltage divider or a Wheatstone measuring bridge. When the membrane is bent and the resulting stresses in the piezoresistive resistors occur, there is a change in the resistance values, which can then be determined by the interconnection and converted into a value for the pressure acting on the membrane.

The piezoresistive resistors are dielectrically isolated from each other and preferably also from the silicon substrate. For example, the dielectric isolation is realized at least partially by the $SiO_2$ layer. In particular, therefore, the piezoresistive resistors are not interconnected by semiconducting material in such a way that current flow between the resistors could occur at high temperatures. In other words, the piezoresistive resistors are not electrically isolated solely by pn junctions from each other.

In at least one embodiment, the sensor includes a deformation body having a membrane for deformation when subjected to pressure from a medium and a strain element applied to and attached to the membrane. The strain element is based on SOI technology and has multiple piezoresistive resistors.

The present invention is based, among other things, on the idea of arranging a strain element based on SOI technology on a deformation body with a membrane. When using a strain element based on SOI technology, the piezoresistive resistors are dielectrically isolated from each other. In contrast to pn-insulated piezoresistive resistors, this allows them to be used at high temperatures. This is because the insulation between the piezoresistive resistors is maintained and stable here even at high temperatures. For example, the sensor described here can be used at temperatures above 250° C., for example at 400° C.

Moreover, the deformation body with the membrane, which is separate from the strain element, can be selected to withstand aggressive media, such as exhaust gases or fuel. In particular, the sensor is then used in such way that the medium is supplied from a side facing away from the strain element, so that the medium preferably does not come into contact with the strain element.

According to at least one embodiment, the piezoresistive resistors are laterally exposed Si resistors. That is, the resistors are spaced apart in the lateral direction by a gas-filled trench or gap. Thus, the area between each two resistors is not or not completely filled with solid material. In particular, the piezoresistive resistors protrude in the direction perpendicular to the main plane of extension of the membrane. The resistors comprise or consist of, for example, p- or n-doped silicon. Between the resistors and the silicon substrate, the $SiO_2$ layer is preferably arranged so that the Si resistors are supported by the $SiO_2$ layer.

According to at least one embodiment, the piezoresistive resistors each comprise or consist of a spatially exposed Si nanowire (Si nanowire). For example, an aspect ratio of the nanowires is at least 5 or at least 10 or at least 20 in each case. For Example, the Si nanowires are each made of p-doped or n-doped silicon. The longitudinal axes of the Si nanowires preferably extend parallel to the principal plane of extension of the membrane. "Spatially exposed" means that the Si nanowires are undercut rather than supported over part of their length. To this end, the $SiO_2$ layer may be removed in the region below the nanowires, allowing the nanowires to vibrate freely in the vertical direction. For example, the nanowires are supported only at their longitudinal ends and rest there on the $SiO_2$ layer, for example.

Alternatively, the nanowires may not be undercut and may be supported along their entire length, for example by the $SiO_2$ layer.

According to at least one embodiment, a connecting means is arranged between the membrane and the strain element. Via the connecting means, the strain element is attached to the membrane. In particular, the connecting means adjoins the membrane on one side and the silicon substrate of the strain element on an opposite side. The connecting means is preferably selected such that the connection remains stable even at high pressures on the membrane, for example of more than 100 bar, and at high temperatures, for example of more than 250° C. The connecting means is made of different materials than the strain element and the deformation body, for example. A maximum and/or average thickness of the connecting means, measured perpendicular to the main extension plane of the membrane, is for example at most 20 μm, for example between 5 μm and 10 μm inclusive. Preferably, the connecting means has a similar coefficient of thermal expansion as the membrane. For example, the coefficients of thermal expansion of the membrane and the connecting means differ by at most 10%.

According to at least one embodiment, the Young's modulus of the connecting means is at least as large as that of the membrane. For example, the Young's modulus of the connecting means is at least 5% or at least 10% greater than the Young's modulus of the membrane. By using such a connecting means, it is achieved that the connection between the membrane and the strain element is not destroyed when the membrane is bent and the associated bending of the connecting means occurs. At pressures occurring as intended, deformation of the connecting means preferably takes place in the Hook's range of the stress-strain diagram of the Young's modulus.

According to at least one embodiment, the connecting means comprises or consists of one or more of the following materials: glass solder, metal solder, inorganic adhesive, organic adhesive. For example, the connecting material is an Au—Sn solder. In particular, such connecting means ensure a stable connection even at high pressures and temperatures. In particular, the connecting material is formed from such a material that this deforms only reversibly during intended operation, for example at pressures up to 1000 bar.

According to at least one embodiment, the strain element covers a major part of the membrane. For example, viewed from above, the strain element covers at least 50% or at least 75% or at least 90% of the membrane. In particular, the strain element covers all areas of the membrane that are not supported by the support body.

According to at least one embodiment, the strain element is connected to the membrane over a major portion of its lateral extent. The lateral extent of the strain element is thereby its extent parallel to the main extension plane of the membrane. For example, the strain element is connected to the membrane along at least 75% or at least 90% or along its entire lateral extent and is supported by the membrane. In this regard, the strain element may be directly connected to the membrane or indirectly connected to the membrane through the connecting means. Particularly preferably, no gas-filled cavity is formed between the strain element and the membrane, in which the strain element is not supported by the membrane.

According to at least one embodiment, the strain element has a maximum thickness of at most 200 μm or at most 150 μm or at most 100 μm. Alternatively or additionally, the maximum thickness of the strain element is at least 10 μm or at least 20 μm. The thickness is again measured perpendicular to the main extension plane of the strain element. In order to achieve a low thickness of the strain element, the silicon substrate may be thinned compared to its initial thickness, which it has in the wafer composite, for example by grinding.

According to at least one embodiment, the deformation body, in particular the membrane, comprises or consists of one or more of the following materials: glass, sapphire, silicon, steel, such as stainless steel, ceramic, such as $ZrO_2$ or $Al_2O_3$. In particular, the membrane is formed of such a material that it deforms only reversibly during intended operation, for example at pressures up to 1000 bar.

According to at least one embodiment, the piezoresistive resistors are arranged in an edge region of the membrane. Preferably, the piezoresistive resistors are arranged in a region of the membrane that is not supported by the support body but is directly adjacent to the support body. In particular, the piezoresistive resistors are arranged in the region of the membrane in which the membrane, and thus the strain element, experiences the greatest bending stress when subjected to pressure. That the piezoresistive resistors are arranged in a region of the membrane means that the piezoresistive resistors overlap with this region when viewed from above.

Next, the method for manufacturing a sensor is disclosed. The method is particularly suitable for manufacturing a sensor described herein. All features disclosed in connection with the sensor are therefore also disclosed for the method, and vice versa.

According to at least one embodiment, the method comprises a step A) in which a deformation body comprising a membrane is provided for deformation upon exposure to pressure from a medium. Further, the method comprises a step B) in which a strain element is provided, the strain element being based on $SiO_2$ technology and comprising a plurality of piezoresistive resistors. In a step C), the strain element is then applied and attached to the membrane.

For example, the strain element is fabricated from a wafer composite comprising a silicon substrate, a silicon layer, and a silicon dioxide layer (SiO$_2$ layer) disposed between the silicon layer and the silicon substrate. The piezoresistive resistors are then fabricated from the silicon layer, for example by etching. Subsequently, the silicon substrate may be thinned to a desired thickness, for example by grinding.

According to at least one embodiment, the strain element is attached to the membrane via a direct bonding process. For example, the silicon substrate of the strain element is thereby brought into direct contact with the membrane, which is formed of ceramic, for example.

According to at least one embodiment, the strain element is attached to the membrane via a connecting means.

Further advantages and advantageous embodiments and further embodiments of the sensor and of the method for producing a sensor result from the following embodiments illustrated in connection with the figures. Identical, similar or similarly acting elements are provided with the same reference signs in the figures. The figures and the proportions of the elements shown in the figures with respect to one another are not to be regarded as to scale. Rather, individual elements, in particular layer thicknesses, may be shown exaggeratedly large for better representability and/or for better comprehensibility.

Figure 2:
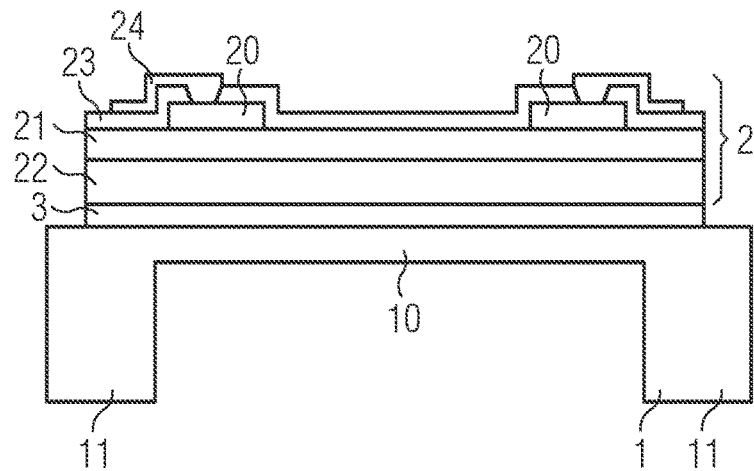
Figure 3:
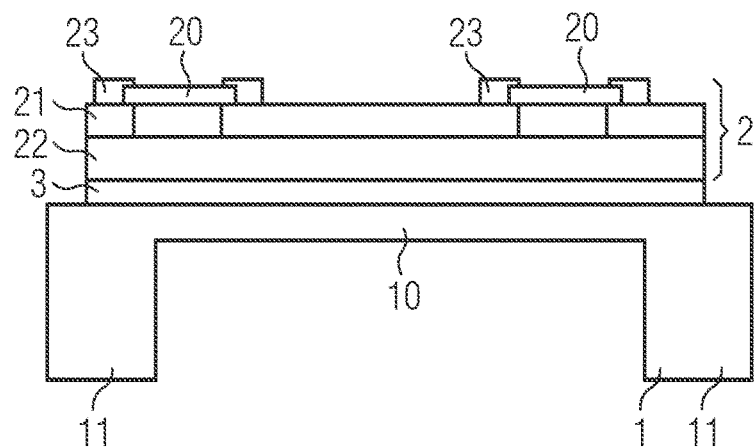
Figure 4:
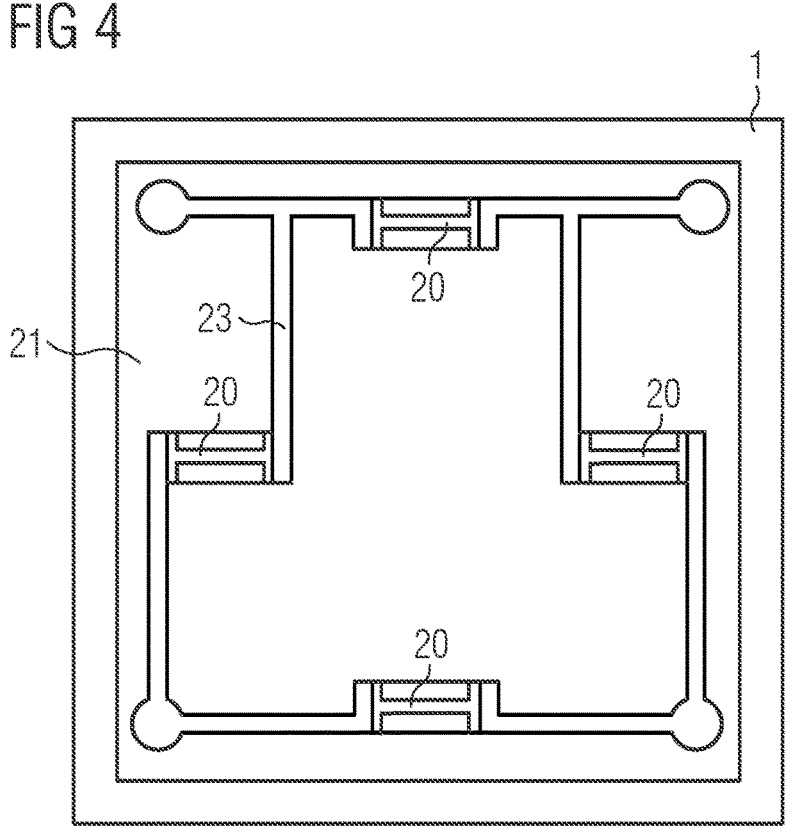

The figures show:

FIGS. 1 and 2: Embodiments of the sensor, each in cross-sectional view,

FIGS. 3 and 4: Embodiment example of the sensor in cross-sectional view and in plan view, FIG. 5: Position in an embodiment example of the method for manufacturing the sensor.

FIG. 1 shows a first embodiment example of the sensor in a cross-sectional view. The sensor comprises a deformation body 1 with a membrane 10 and a support body 11. The membrane 10 is supported in edge regions by the support body 11. In an inner region of the membrane 10, the membrane 10 is not supported by the support body 11 and is freely oscillatable or freely bendable relative to the support body 11.

Presently, the membrane 10 and the support body 11 are formed in one piece, and consist, for example, of ceramic. However, it is also possible that the support body 11 and the membrane 10 are not formed integrally with one another and are made of different materials, for example.

A strain element 2 is arranged on a side of the membrane 10 facing away from the support body 11. The strain element 2 is a semiconductor chip based on SOI technology. The strain element 2 comprises a silicon substrate 22 and a SiO$_2$ layer 21 on the silicon substrate 22. Laterally exposed piezoresistive resistors 20 made of silicon are arranged on a side of the SiO$_2$ layer 21 facing away from the silicon substrate 22. The piezoresistive resistors 20 are electrically isolated from each other and also from the silicon substrate 22 by the SiO$_2$ layer. On a side facing away from the silicon substrate 22, the piezoresistive resistors 20 are passivated by a passivation layer 23, for example of silicon nitride. The piezoresistive resistors 20 are electrically contacted via metallic conductor tracks 24.

During operation of the sensor, for example, the side of the membrane 10 facing away from the strain element 2 is brought into contact with a medium, for example a liquid such as oil or water. The pressure exerted on the membrane 10 by the medium causes the membrane 10 to bend, which also causes the strain element 2 to bend and the piezoresistive resistors 20 to become strained. This tension changes the resistance value of the piezoresistive resistors 20, which can be measured via the contacting through the conductor tracks 24. For example, the piezoresistive resistors 20 are connected to form a Wheatstone measuring bridge.

In FIG. 1, the strain element 2 is applied directly to the membrane 10 such that the silicon substrate 22 is in direct contact with the membrane 10. For example, the strain element 2 is applied to the membrane 10 via direct bonding. The strain element 2 completely covers the membrane 10, in particular the unsupported part of the membrane 10. In this case, the strain element 2 is directly bonded to the membrane 10 along the entire lateral extent of the strain element 2.

FIG. 2 shows a second embodiment of the sensor. Here, the strain element 2 is constructed in exactly the same way as in FIG. 1, but unlike in FIG. 1, the strain element 2 is applied to the membrane 10 via a connecting means 3 and is connected to the membrane 10 via this connecting means. The connecting means 3 is, for example, a glass solder or a metal solder or an organic adhesive or an inorganic adhesive. The modulus of elasticity of the connecting means 3 is preferably at least as great as that of the membrane 10. In the present case, the membrane 10 consists, for example, of stainless steel.

FIG. 3 shows a third embodiment of the sensor in a cross-sectional view. Here, the piezoresistive resistors 20 each comprise a nanowire made of silicon. The nanowires are spatially exposed in such a way that the nanowires are unsupported and freely suspended above the silicon substrate 22, at least in regions. Thus, the SiO$_2$ layer is removed in areas in the region below the nanowires so that the nanowires are not supported by the SiO$_2$ layer there. As in the second embodiment, the strain element 2 is here again attached to the membrane 10 with the aid of a connecting means 3.

FIG. 4 shows a top view of the third embodiment of the sensor. It can be seen that the strain element 2 comprises four piezoresistive resistors 20 each with a nanowire. The piezoresistive resistors 20 are connected to each other via metallic conductor tracks 23 to form a Wheatstone measuring bridge.

Figure 5:
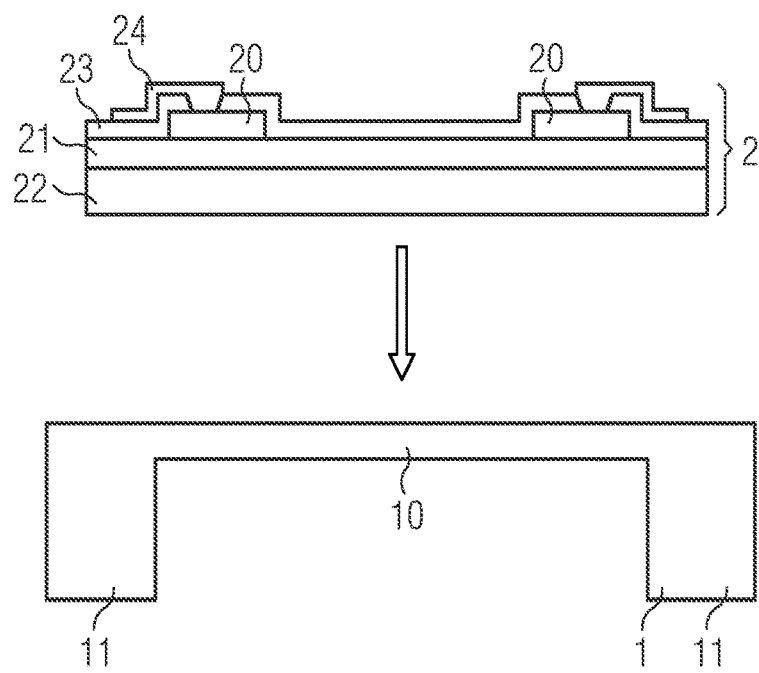

FIG. 5 shows a position in an embodiment example of the method for manufacturing a sensor. Here, a strain element 2 based on SOI technology with several piezoresistive resistors 20 and a deformation body 1 with a membrane 10 are provided. The strain element 2 is applied to and attached to the membrane 10. Shown here is the case where the strain element 2 is applied directly to the membrane 10, for example by direct bonding. Alternatively, the strain element 2 could be attached to the membrane 10 using a connecting means.

The invention is not limited to the embodiments by the description based thereon. Rather, the invention encompasses any new feature as well as any combination of features, which in particular includes any combination of features in the claims, even if these features or this combination itself are not explicitly stated in the claims or embodiments.

LIST OF REFERENCE SIGNS

1 Deformation body
2 Strain element
3 Connecting means
10 membrane
11 support body
20 piezoresistive resistor
21 SiO$_2$ layer
22 silicon substrate
23 passivation layer
24 conductor track

The invention claimed is:

1. A sensor comprising:
a deformation body having a membrane for deformation when subjected to pressure from a medium; and
a strain element applied to the membrane and fixed to the membrane, wherein
the strain element is based on SOI technology and comprises a plurality of piezoresistive resistors, each piezoresistive resistor comprising a spatially exposed Si nanowire.

2. The sensor according to claim 1, wherein:
a connecting means is arranged between the membrane and the strain element, and
the strain element is fixed to the membrane via the connecting means.

3. The sensor according to claim 2, wherein the Young's modulus of the connecting means is at least as great as that of the membrane.

4. The sensor according to claim 2, wherein the connecting means comprises a glass solder or a metal solder or an inorganic adhesive or an organic adhesive.

5. The sensor according to claim 1, wherein the strain element covers a major part of the membrane.

6. The sensor according to claim 1, wherein the strain element is connected to the membrane over a major portion of a lateral extent of the strain element.

7. The sensor according to claim 1, wherein the strain element has a maximum thickness of at most 200 μm.

8. The sensor according to claim 1, wherein the deformation body comprises or consists of one or more of the following materials:
glass, sapphire, silicon, steel, ceramic.

9. The sensor according to claim 1, wherein the piezoresistive resistors are arranged in an edge region of the membrane.

10. A method of manufacturing a sensor, comprising the steps:
A) providing a deformation body with a membrane for deformation when subjected to pressure from a medium,
B) providing a strain element, wherein the strain element is based on SOI technology and comprises a plurality of piezoresistive resistors,
C) applying and fixing the strain element to the membrane.

11. The method according to claim 10, wherein the strain element is attached to the membrane via a direct bonding process.

12. The method according to claim 10, wherein the strain element is attached to the membrane via a connecting means.

13. A sensor comprising:
a deformation body having a membrane for deformation when subjected to pressure from a medium; and
a strain element applied to the membrane and fixed to the membrane, wherein
the strain element is based on SOI technology and comprises a plurality of piezoresistive resistors,
a connecting means is arranged between the membrane and the strain element, and
the strain element is fixed to the membrane via the connecting means.

14. The sensor according to claim 13, wherein the Young's modulus of the connecting means is at least as great as that of the membrane.

15. The sensor according to claim 13, wherein the connecting means comprises a glass solder or a metal solder or an inorganic adhesive or an organic adhesive.

16. The sensor according to claim 13, wherein the strain element has a maximum thickness of at most 200 μm.

17. The sensor according to claim 13, wherein the deformation body comprises or consists of one or more of the following materials:
glass, sapphire, silicon, steel, ceramic.

18. The sensor according to claim 13, wherein the strain element covers a major part of the membrane.

19. The sensor according to claim 13, wherein the piezoresistive resistors are arranged in an edge region of the membrane.

* * * * *